United States Patent [19]
Miller

[11] Patent Number: 5,924,161
[45] Date of Patent: Jul. 20, 1999

[54] AUTOMATIC REAR VIEW MIRROR WIPER

[76] Inventor: Clifford Miller, 115 Briarcliff, Vidor, Tex. 77662

[21] Appl. No.: 09/031,306

[22] Filed: Feb. 26, 1998

[51] Int. Cl.[6] .................................. B60S 1/56; B60S 1/26
[52] U.S. Cl. .................................. 15/250.003; 15/250.12; 74/89.17; 192/143
[58] Field of Search .......................... 15/250.003, 250.3, 15/250.12, 250.13, 250.31, 250.29; 318/483, DIG. 2; 74/33, 89.17; 192/143

[56] References Cited

U.S. PATENT DOCUMENTS

| | | | |
|---|---|---|---|
| 1,365,391 | 1/1921 | Folberth | 15/250.3 |
| 1,812,918 | 7/1931 | Aufiero | 15/250.3 |
| 2,913,754 | 11/1959 | Vander Zee | 15/250.3 |
| 3,940,822 | 3/1976 | Emerick et al. | 15/250.22 |
| 3,968,537 | 7/1976 | Wagenhofer | 15/250.29 |
| 4,037,286 | 7/1977 | Medearis et al. | 15/250.05 |
| 4,339,169 | 7/1982 | Addison, Jr. | 350/61 |
| 4,463,294 | 7/1984 | Gibson | 318/483 |
| 4,466,712 | 8/1984 | Vitaloni | 15/250.003 |
| 4,653,136 | 3/1987 | Denison | 15/250 B |
| 4,870,713 | 10/1989 | Raynor | 15/250.01 |
| 5,119,002 | 6/1992 | Kato et al. | 318/DIG. 2 |
| 5,446,586 | 8/1995 | Dornier | 15/250.003 |
| 5,522,112 | 6/1996 | Tiffany, III | 15/250.003 |

FOREIGN PATENT DOCUMENTS

| | | | |
|---|---|---|---|
| 229252 | 7/1959 | Australia | 15/250.003 |
| 60945 | 4/1982 | Japan | 15/250.003 |

*Primary Examiner*—Gary K. Graham
*Attorney, Agent, or Firm*—Henderson & Sturm

[57] ABSTRACT

A wiper assembly 30 for a rear view mirror 14 of a vehicle 22 that is automatically activated by a moisture sensor 60 attached to the exterior surface of a housing 12. The housing 12 is attached to the vehicle 22 by a mounting bracket 18 that includes an arm 20 interconnecting the vehicle 22 and the housing 12. The bracket arm 20 has an interior passage 21 that receives electrical wiring 50 that electrically connects a power source in the vehicle 22 to an electric motor 40 that drives the wiper assembly 30. A rack 44 and pinion 42 structure, in conjunction with motor reversing limit switches 48 provides for reciprocating movement of a wiper blade 36 across the reflective surface 16 of the mirror 14. An override switch 70 is located in the vehicle 22 so that the driver may selectively override the automatic activation of the wiper.

3 Claims, 2 Drawing Sheets

AUTOMATIC REAR VIEW MIRROR WIPER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of vehicle accessories, and more particularly to rear view mirror wipers.

2. Description of Related Art

As can be seen by reference to the following U.S. Pat. Nos. 3,940,822; 3,968,537; 4,037,286; 4,339,169; 4,653,136; and 4,870,173, the prior art is replete with myriad and diverse wipers for rear view mirrors.

While all of the aforementioned prior art constructions are more than adequate for the basic purpose and function for which they have been specifically designed, they are uniformly deficient with respect to their failure to provide a simple, efficient, and practical automatic rear view mirror wiper.

As a consequence of the foregoing situation, there has existed a longstanding need for a new and improved rear view mirror wiper that is automatically actuated, and the provision of such a construction is a stated objective of the present invention.

BRIEF SUMMARY OF THE INVENTION

Briefly stated, the present invention provides a wiper assembly for a rear view mirror of a vehicle that is automatically activated by a moisture sensor attached to the exterior surface of a housing.

As will be explained in greater detail further on in the specification, the housing is attached to the vehicle by a mounting bracket that includes an arm interconnecting the vehicle and the housing. The bracket arm has an interior passage that receives electrical wiring that electrically connects a power source in the vehicle to an electric motor that drives the wiper assembly. A rack and pinion structure, in conjunction with motor reversing limit switches, provides for reciprocating movement of a wiper blade across the reflective surface of the mirror. An override switch is located in the vehicle so that the driver may selectively override the automatic activation of the wiper.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
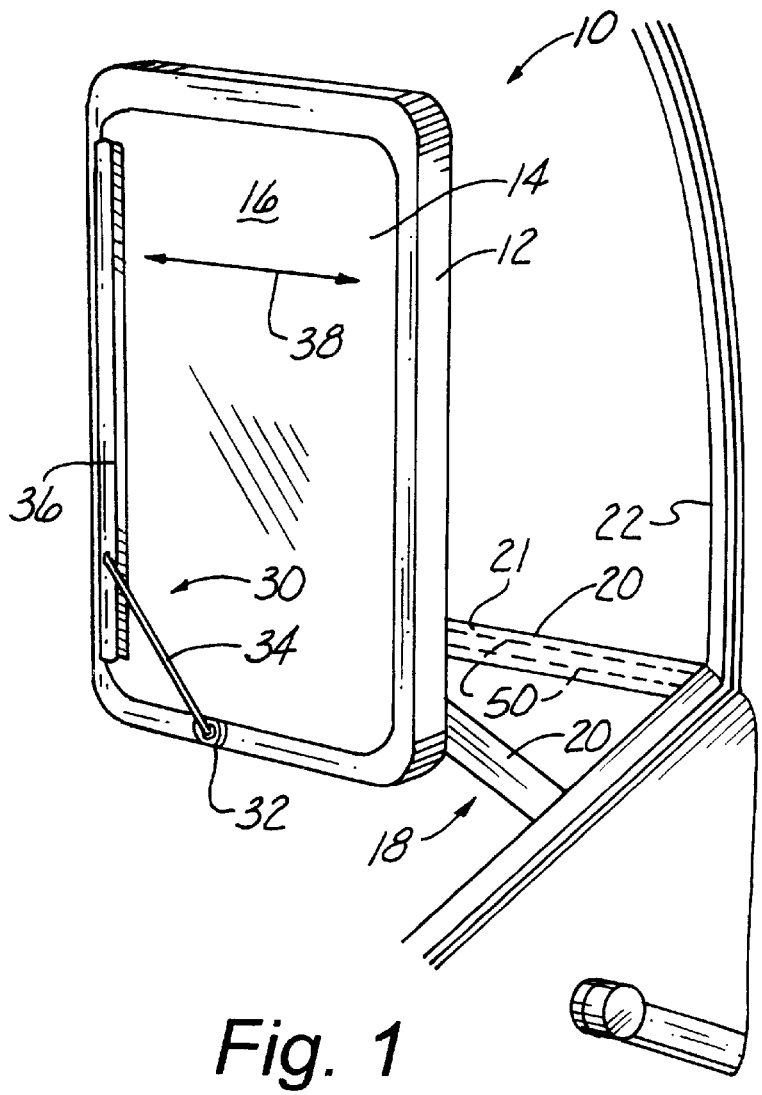
FIG. 1 is a perspective view of the automatic rear view mirror wiper of the present invention.

As can be seen by reference to the drawings, and in particularly to FIG. 1, the automatic rear view mirror wiper construction that forms the basis of the present invention is designated generally by the reference number 10. The construction 10 includes a housing 12 having an interior cavity. A mirror 14 is secured in the housing 12 such that the reflective surface 16 forms the front exterior face of the housing 12. A mounting bracket 18, including arms 20, interconnects the housing 12 and the semi-trailer truck cab or other vehicle 22. One of the arms 20 includes an interior passage 21 communicating between the housing 12 and the vehicle 22.

Figure 3:
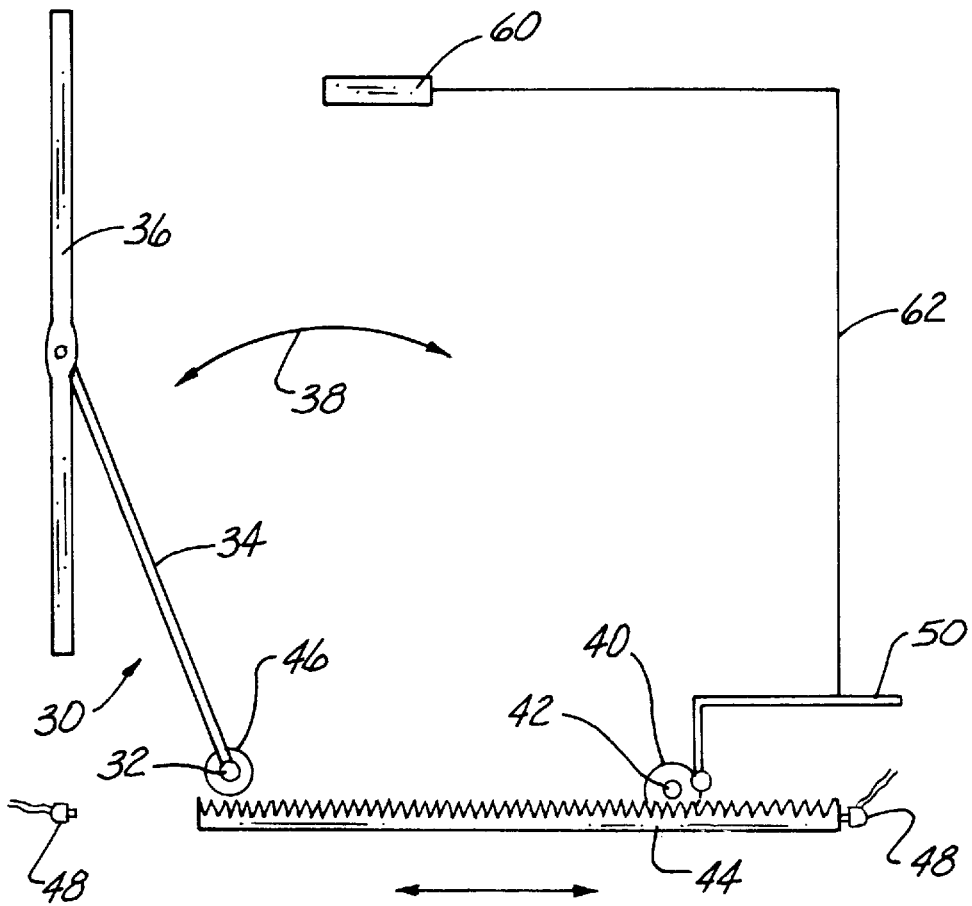
FIG. 3 is a schematic view illustrating the rack and pinion reciprocating drive for the wiper assembly.

As best illustrated by FIGS. 1 and 3, the wiper assembly 30 is attached to the housing 12 and includes a stainless steel fluted shaft connection 32, a stainless steel wiper arm 34 and a wiper blade 36. The wiper blade 36 contacts and moves across the reflective surface 16 as indicated by the direction arrow 38.

Figure 2:
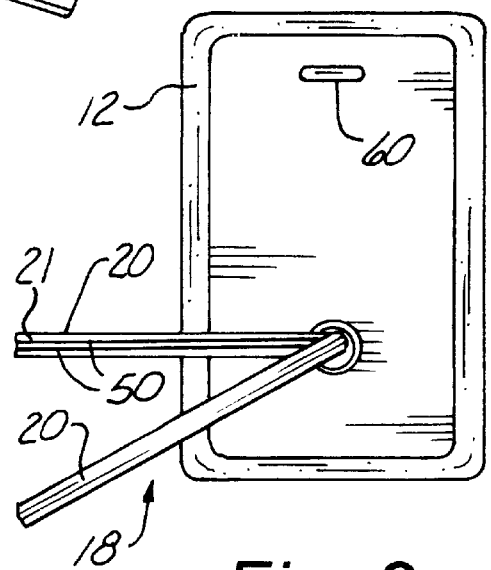
FIG. 2 is a rear elevational view showing the location of the moisture sensor on the rear exterior surface of the mirror housing.
Figure 4:
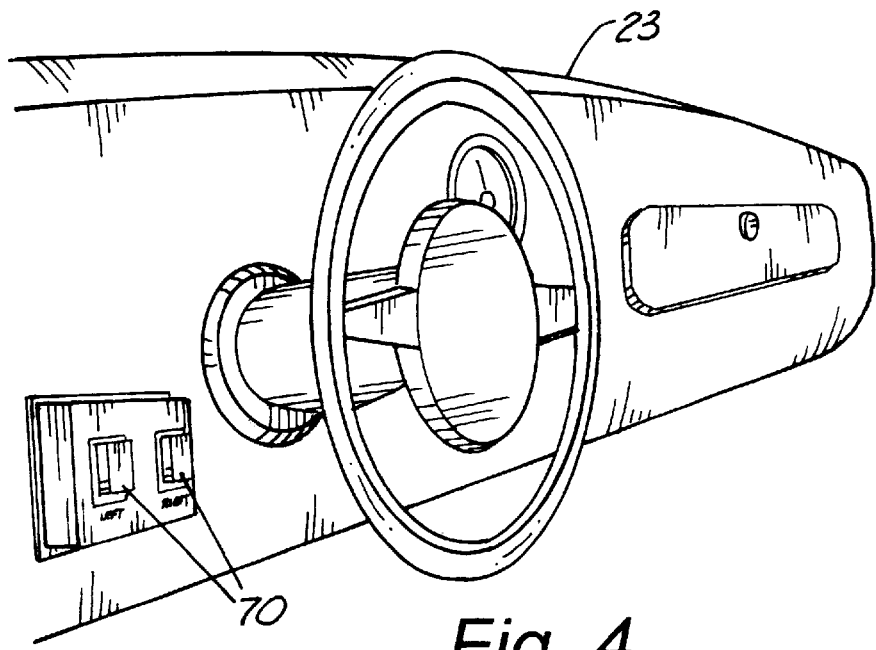
FIG. 4 is a perspective view of the dashboard of the vehicle showing the location of the override switches.

A reversible DC gear motor 40 is secured within the housing 12. The motor 40 carries a pinion drive gear 42 disposed to engage and move a sliding linear rack gear 44. The rack gear 44 engages a wiper driven gear 46, and the ends of the rack gear 44 engage and activate limit switches 48 that are electrically connected to the motor 40. The motor 40 is electrically coupled to a power source in the vehicle 22 by wiring 50 that extends through the internal passage 21 of the bracket arm 26. A moisture sensor 60 is attached to the rear exterior surface of the housing 12 (FIG. 2), and is electrically connected to the motor 40 by wiring 62. An override control 70 is mounted on the dashboard 23 of the vehicle 22 to allow the operator to deactivate the motor 40. Left and right override controls 70 are shown in FIG. 4.

In use, one or both of the existing side rear view mirrors of a semi-trailer truck or other vehicle 22 are removed and the automatic rear view mirror wiper construction 10 of the present invention are installed. The wiring 50 is connected to the vehicle's power supply (not shown) and the override controls 70 are mounted on the dashboard 23. When the moisture sensor 60 detects moisture either by direct contact or excessive humidity, the motor 40 is automatically activated to drive the wiper assembly 30.

When activated, the pinion gear 42 of the motor 42 drives the rack 44 which in turn drives the driven gear 46 to move the wiper assembly 30. When the rack 44 contacts one of the limit switches 48, the switch 48 reverses the direction of the DC gear motor 40, which in turn reverses the direction of the wiper assembly 30. When the opposite limit switch 48 is contacted by the rack 44, the motor 40 reverses again, and continues to reciprocate in this manner until the power source to the motor 40 is switched off. This mechanical operation provides the desired reciprocal movement of the wiper blade 36 over the reflective surface 16 of the mirror 14 to keep it clear of moisture.

The electronic moisture sensor 60 and associated electronics will automatically activate the wiper assembly 30 when the sensor 60 detects ambient moisture, either in the form of liquid rain or high humidity that may cause condensation of moisture on the reflective surface 16 of the mirror 14. If the driver wishes to override the activation by the sensor 60, they simply press the override control 70 located on the dashboard 23 to deactivate.

The automatic rear view mirror construction 10 of the present invention provides the driver with a safety device that prevents moisture from obscuring visibility while changing lanes in bad weather. Often the decision to change lanes must be made in a split second, as for example, when another vehicle suddenly stops in the path of travel. Automatic activation provides an unobscured view at all times so that this decision may be quickly and safely made.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures.

I claim:

1. An outside rear view mirror wiper for a vehicle, comprising:

a housing including an interior cavity;

a mirror secured within the housing, the mirror including a reflective surface disposed to define a front exterior face of the housing;

a mounting bracket including an arm interconnecting the vehicle and the housing, the arm having an interior passage;

a wiper assembly attached to the housing, the wiper assembly including a wiper blade disposed to contact and move across the reflective surface;

an electric drive motor disposed within the housing and being drivingly connected to the wiper assembly, the motor being electrically connected to a power source in the vehicle via electrical wiring extending through the interior passage of the bracket arm;

means interconnecting the drive motor and the wiper assembly for reciprocally moving the wiper blade; wherein the reciprocal moving means includes a sliding rack disposed within the housing to drivably interconnect the motor and the wiper assembly and further including limit switches disposed within the housing to be contacted by the sliding rack, the limit switches being electrically connected to the motor to reverse the motor when contacted by the rack; and a moisture sensor attached to an exterior surface of the housing exposed to ambient conditions, the sensor being electrically coupled to the drive motor, wherein the motor is automatically activated by the sensor when ambient moisture is detected by the sensor.

2. The rear view mirror wiper of claim 1 further including an override control disposed within the vehicle, and being electrically connected to the drive motor, wherein a vehicle operator may selectively override the automatic activation of the motor by the sensor.

3. The rear view mirror wiper of claim 1 wherein the moisture sensor is attached to a rear exterior surface of the housing.

* * * * *